(12) United States Patent
Fujita et al.

(10) Patent No.: US 10,740,425 B2
(45) Date of Patent: Aug. 11, 2020

(54) CONTENT ADMINISTRATION SYSTEM

(75) Inventors: Takeshi Fujita, Chiba-ken (JP); Mayuko Hattori, Chiba (JP); Shuji Masumoto, Tokyo (JP); Tsutomu Kawachi, Tokyo (JP)

(73) Assignee: Sony Corporation, Tokyo (JP)

( * ) Notice: Subject to any disclaimer, the term of this patent is extended or adjusted under 35 U.S.C. 154(b) by 1223 days.

(21) Appl. No.: 13/114,531

(22) Filed: May 24, 2011

(65) Prior Publication Data

US 2011/0225483 A1 Sep. 15, 2011

Related U.S. Application Data

(63) Continuation of application No. 11/856,462, filed on Sep. 17, 2007, which is a continuation of application
(Continued)

(30) Foreign Application Priority Data

Mar. 24, 2003 (JP) ................................ 2003-080059

(51) Int. Cl.
G06F 3/048 (2013.01)
G06F 16/957 (2019.01)
G06F 3/0481 (2013.01)

(52) U.S. Cl.
CPC ........ *G06F 16/957* (2019.01); *G06F 3/04817* (2013.01); *Y10S 707/915* (2013.01); *Y10S 707/959* (2013.01); *Y10S 707/99939* (2013.01)

(58) Field of Classification Search
CPC ......... G06F 17/30014; G06F 17/30867; G06F 16/957; G06F 3/04817
(Continued)

(56) References Cited

U.S. PATENT DOCUMENTS 6,061,660 A 5/2000 Eggleston et al.
6,571,245 B2 5/2003 Huang et al.
(Continued)

FOREIGN PATENT DOCUMENTS

JP 04-125764 4/1992
JP 06-214862 8/1994
(Continued)

OTHER PUBLICATIONS

Japanese Office Action dated Sep. 8, 2009, corresponding to Japanese Appln. No. 2003-080059.
(Continued)

*Primary Examiner* — Keith D Bloomquist
(74) *Attorney, Agent, or Firm* — K&L Gates LLP

(57) ABSTRACT

A content administration system receives user identification information from a terminal device via the Internet. The content administration system then specifies content administration information storage means corresponding to the received user identification information. The content administration system acquires object path information correlated to sharing permission information from a content administration information storage means of another unspecified user. The content administration system then acquires an icon image from the icon image storage means. The content administration system then makes display control information for the content administration screen containing the icon leading to the object based on the acquired icon image and the acquired object path information. The content administration system transmits the made display control information to the terminal device via the Internet. As a result, an administrator of a web site does not have to add a content path corresponding to an HTML file when adding content to a web site administered by themselves or when sharing content with another web site.

24 Claims, 8 Drawing Sheets

Related U.S. Application Data

No. 10/807,735, filed on Mar. 24, 2004, now Pat. No. 7,272,603.

(58) Field of Classification Search
USPC .................. 715/205, 208, 234, 241
See application file for complete search history.

(56) References Cited

U.S. PATENT DOCUMENTS

| | | | |
|---|---|---|---|
| 6,665,685 | B1 | 12/2003 | Bialic |
| 6,693,652 | B1* | 2/2004 | Barrus .................. G06F 3/0481 |
| | | | 715/838 |
| 6,795,537 | B1 | 9/2004 | Gilbert |
| 6,904,460 | B1 | 6/2005 | Raciborski et al. |
| 6,938,042 | B2 | 8/2005 | Aboulhosn et al. |
| 6,938,079 | B1* | 8/2005 | Anderson et al. ............ 709/222 |
| 6,963,901 | B1 | 11/2005 | Bates et al. |
| 6,976,094 | B1 | 12/2005 | Dalrymple et al. |
| 6,981,041 | B2 | 12/2005 | Araujo et al. |
| 2002/0016848 | A1* | 2/2002 | Yoshimine .......... G06F 17/3089 |
| | | | 709/231 |
| 2002/0029183 | A1* | 3/2002 | Vlahoplus et al. ............. 705/37 |
| 2002/0052934 | A1* | 5/2002 | Doherty ........................ 709/219 |
| 2002/0065878 | A1* | 5/2002 | Paxhia et al. .................. 709/203 |
| 2002/0083119 | A1* | 6/2002 | Matsui ................. G06Q 10/025 |
| | | | 709/200 |
| 2003/0095524 | A1* | 5/2003 | Stephens et al. ............. 370/338 |
| 2003/0099202 | A1* | 5/2003 | Lear et al. .................... 370/238 |
| 2003/0120680 | A1* | 6/2003 | Agrawal et al. ......... 707/103 R |
| 2003/0195950 | A1 | 10/2003 | Huang et al. |
| 2003/0202645 | A1* | 10/2003 | Naik et al. .................. 379/201.1 |
| 2004/0044589 | A1* | 3/2004 | Inoue et al. .................... 705/27 |

FOREIGN PATENT DOCUMENTS

| | | |
|---|---|---|
| JP | 11-015724 | 1/1999 |
| JP | 2000-259730 | 9/2000 |
| JP | 2003-006111 | 6/2001 |
| JP | 2001-306620 | 11/2001 |
| JP | 2001-309298 | 11/2001 |
| JP | 2002-041576 | 2/2002 |
| JP | 2002-165199 | 6/2002 |
| JP | 2002-304314 | 10/2002 |
| JP | 2002-342148 | 11/2002 |
| JP | 2003-044483 | 2/2003 |
| JP | 2003-067651 | 3/2003 |

OTHER PUBLICATIONS

Japanese Office Action dated May 25, 2010, corresponding to Japanese Appln. No. 2003-080059.

Field, Koib, Web Development by JSP, New development technique of contents using servlet architecture Shoeisha Co. Ltd., Mar. 30, 2001, first edition, pp. 398-405.

Taniguchi, Web server construction technique No. 4, UNIX User, Dec. 1, 1997, Softbank Corporation, pp. 97-106.

Japanese Patent Office, Office Action issued in connection with Japanese Patent Application No. 2010-187389, dated Apr. 2, 2013. (4 pages).

Japanese Office Action dated Dec. 10, 2013 for corresponding Japanese Appln. No. 2010-187389.

Japanese Office Action dated Feb. 24, 2015 for corresponding Japanese Appln. No. 2014-044988.

* cited by examiner

FOLDER ADMINISTRATION LOG 208

| FOLDER NUMBER | FOLDER TITLE | FOLDER PASSWORD | URL AT THE TIME OF FTP | SHARING PERMITTED /NOT PERMITTED | SHARING SOURCE USER NAME |
|---|---|---|---|---|---|
| F100 | Folger-100 | ********* | ftp://domain-A/100/ | 1 | user-A |
| F101 | Folger-101 | ********* | ftp://domain-A/101/ | 0 | user-A |
| F102 | Folger-102 | ********* | ftp://domain-A/102/ | 1 | user-A |
| F105 | Folger-105 | ********* | ftp://domain-A/105/ | 0 | user-A |
| F107 | Folger-107 | ********* | ftp://domain-A/105/107/ | 0 | user-A |
| F108 | Folger-108 | ********* | ftp://domain-A/105/108/ | 0 | |
| ... | | | | | |
| F200 | Folger-200 | ********* | ftp://domain-A/200/ | 0 | user-A1 |
| F201 | Folger-201 | ********* | ftp://domain-A/201/ | 0 | user-A1 |
| ... | | | | | |
| F300 | Folger-300 | ********* | ftp://domain-B/300/ | 0 | user-B |
| F301 | Folger-301 | ********** | ftp://domain-B/301/ | 0 | user-B |
| ... | | | | | |

FIG. 4

CONTENT ADMINISTRATION LOG

| FOLDER NUMBER | ICON NUMBER | TITLE | FORMAT |
|---|---|---|---|
| ⋮ | | | |
| F105 | I001 | File-001 | JPEG |
| F105 | I002 | File-002 | TXT |
| F105 | I003 | File-003 | HTML |
| ⋮ | | | |
| F105 | F107 | Folder-107 | Directory |
| F105 | F108 | Folder-108 | Directory |
| ⋮ | | | |
| F105 | F200 | Folder-108 | Directory |
| ⋮ | | | |

FIG. 5

CONTENT ADMINISTRATION SYSTEM

CROSS-REFERENCE TO RELATED APPLICATIONS

This application is a continuation of U.S. patent application Ser. No. 14/856,462, filed Sep. 17, 2007, which is a continuation of U.S. patent application Ser. No. 10/807,735, filed Mar. 24, 2004, which issued as U.S. Pat. No. 7,272,630 on Sep. 18, 2007, which claims priority to Japanese Patent Application No. 2003-080059, filed Mar. 24, 2003, all of which are incorporated herein by reference in their entirety.

FIELD OF THE INVENTION

The present invention relates to a content administration system for administrating content of a WEB server connected to the Internet.

BACKGROUND OF THE INVENTION

In the related art, an administrator of a web site adds a content path corresponding to an HTML file when adding content to a web site administered by themselves or when sharing content with another web site. Further, it is possible for the aforementioned content to be downloaded to a terminal device such as a PC (Personal Computer) as a result of a user designating a prescribed URL using a web browser and for the content to then be displayed etc. using the web browser or a corresponding application.

However, having an administrator of a web site add content paths corresponding to HTML files when adding content to a web site administered by themselves or when sharing content with another web site places a large burden on the administrator. Further, there are also cases where it is not possible to execute the content when an application program corresponding to the content is not installed on the terminal device of the user. Further, in order to display the downloaded content using an application of the terminal device, it is necessary to carry out setting such as installation of applications at every terminal device. In order to utilize content downloaded and edited at a terminal device at another terminal device, it is necessary to send the content via a network set in a manner enabling transmission and receipt to and from the other terminal device in advance, or it is necessary for this content to be carried via a recording medium such as a flexible disc etc. Further, when the content is sent to another terminal device via a network, it is necessary for the sender to be aware of the address of the terminal device, which presents problems with regards to security.

SUMMARY OF THE INVENTION

In order to resolve the aforementioned problems, it is therefore the object of the present invention for an administrator of a web site not to have to add a content path for an HTML file in the case of adding content to a web site administered by themselves or when sharing content with other web sites.

In order to achieve the aforementioned object, in an aspect of the invention, a content administration system is provided with content administration information storage means for storing individual content administration information for every item of user identification information, icon image storage means for storing icon images, communicating means for communicating with an external terminal device via the Internet, and information processing means for controlling operation of each means. Here, the content administration information storage means stores object path information identifying an object storage location and sharing permission information indicating whether the object may be utilized by other users. The content administration system then carries out the following processing. The processing means receives user identification information from the terminal device via the Internet. The processing means then specifies content administration information storage means corresponding to the received user identification information. Next, the processing means acquires object path information correlated to the sharing permission information from content administration information storage means of another unspecified user. The processing means then acquires an icon image from the icon image storage means. The processing means makes display control information for the content administration screen containing the icon leading to the object based on the acquired icon image and the acquired object path information. The processing means then transmits the made display control information to the terminal device via the Internet.

With the present invention, it is possible to easily share content etc. at the same server device between pre-registered users.

In the embodiment of the invention described later, a "user ID" and "password" correspond to user identification information. Further, "folder information" and "content information" correspond to the content administration information. Moreover, the content administration information storage means is constituted by a storage region on a storage device. Further, "folder" and "content (content file)" etc. correspond to the object. "URL for the time of an FTP" corresponds to the object path information. "sharing permitted/not permitted" of a value of 1 corresponds to information permitting sharing.

In another aspect, the content administration system comprises icon image storage means for storing icon images, communicating means for communicating with an external terminal device via the Internet and information processing means for controlling operation of each means. The content administration system then carries out the following processing. The processing means acquires object path information identifying a storage location of an object at another server device from the terminal device via the Internet, The processing means then acquires an icon image from the icon image storage means. The processing means makes display control information for the content administration screen containing the icon leading to the object based on the acquired icon image and the acquired object path information. The processing means then transmits the made display control information to the terminal device via the Internet.

With the present invention, it is possible to easily share content etc. between users of different server devices.

In another aspect of the invention, the processing means of the content administration system executes the following processing. The processing means receives an upload request from the terminal device. Further, the processing means receives files stored with object path information saved at the desktop of the terminal device based on the received upload request. The processing means acquires the object path information from the received file.

With the present invention, it is possible to easily share content etc. between users of different server devices via files.

In another aspect of the invention, the processing means of the content administration system executes the following processing. The processing means receives an upload request from the terminal device. Receiving a cached file of a web browser of the terminal device storing the object path information based on the received upload request. Acquiring the object path information from the received cached file.

With the present invention, it is possible to easily share content etc. between users of different server devices by utilizing cached files of the web browser.

In another aspect of the content administration system comprises icon image storage means for storing icon images, communicating means for communicating with an external server device or terminal device via the Internet, and information processing means for controlling operation of each means. The content administration system then carries out the following processing. The processing means acquires object path information identifying a storage location of an object administered by the external server device from the external server device. The processing means then acquires an icon image from the icon image storage means. The processing means makes display control information for the content administration screen containing the icon leading to the object based on the acquired icon image and the acquired object path information. The processing means then transmits the made display control information to the external terminal device via the Internet.

With the present invention, it is possible to easily share content etc. between users of different server devices.

In another aspect of the invention, the processing means of the content administration system executes the following processing. The processing means acquires the object path information from the external server device using socket communication between server devices.

With the present invention, it is possible to easily share content etc. between users of different server devices.

As a result of the present invention functioning with the above configuration, the content administration system acquires object path information of a user object at the content administration system or external server device, and sends display control information for a content administration screen containing an icon leading to the object to a terminal device of another user based on the acquired object path information and an icon image stored in advance in the storage device. As a result objects can be shared in a straightforward manner between the user and other users without it being necessary to add paths.

BRIEF DESCRIPTION OF THE DRAWINGS

FIG. 4 is a structural view of a folder administration log.

FIG. 5 is a structural view of a content administration log.

DETAILED DESCRIPTION OF PREFERRED EMBODIMENT

In the following, a detailed description of the present invention is given with reference to the drawings.

Figure 1:
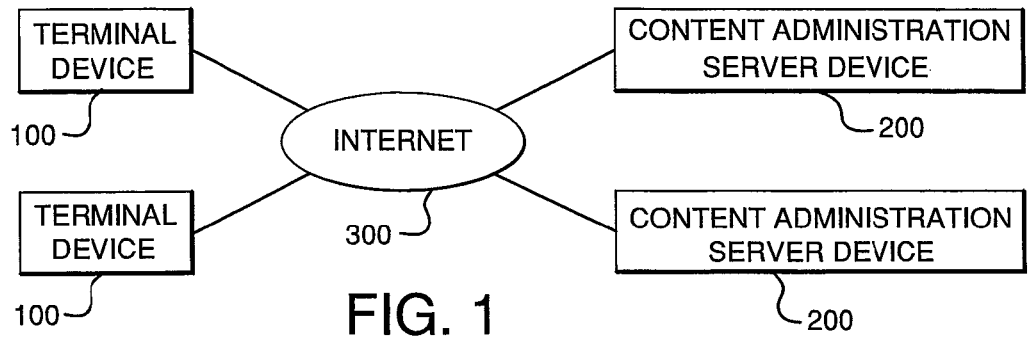
FIG. 1 is a block view showing an overall configuration for a system of an embodiment.

FIG. 1 is a block view showing an overall configuration for a system of an embodiment. A terminal device 100 and a content administration server device 200 are connected to the Internet. The content administration server device 200 is equipped with a WEB server function and a function for providing content stored on the content administration server device 200 or content stored on other content administration server devices to the user. Further, content provided by the content administration server device 200 can be executed by designating a prescribed URL using the WEB browser of the terminal device 100.

Figure 2:
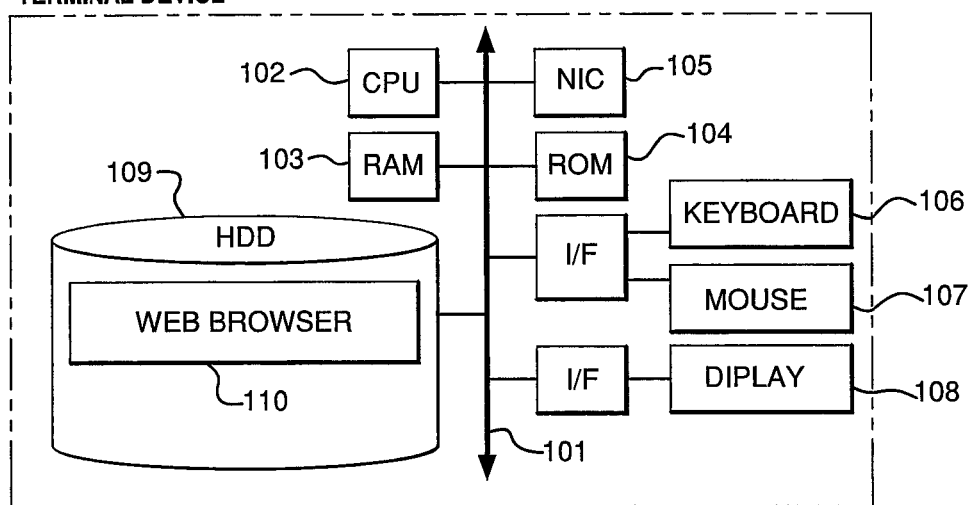
FIG. 2 is a block view showing a configuration for a terminal device.

FIG. 2 is a view of the configuration of a PC constituting a typical terminal device 100. A keyboard 106 and mouse 107 taken as input means, display 108 taken as display means, CPU 102 taken as processing means, RAM 103, ROM 104 and HDD 109 (Hard Disk Drive) taken as a storage device, and NIC 105 (Network Interface Card) taken as communicating means are connected to a bus 101. The I/F is shown as an interface between a bus and various devices. A WEB browser etc. is stored in the HDD 109. The CPU 102 implements a function for displaying and playing back audio for content provided by the content administration server device 200 at the WEB browser by reading and executing a WEB browser etc. stored in the HDD 109 at a RAM 103, and a function for transmitting information to and from the content administration server device 200 via the NIC 105 and the Internet 300.

Figure 3:
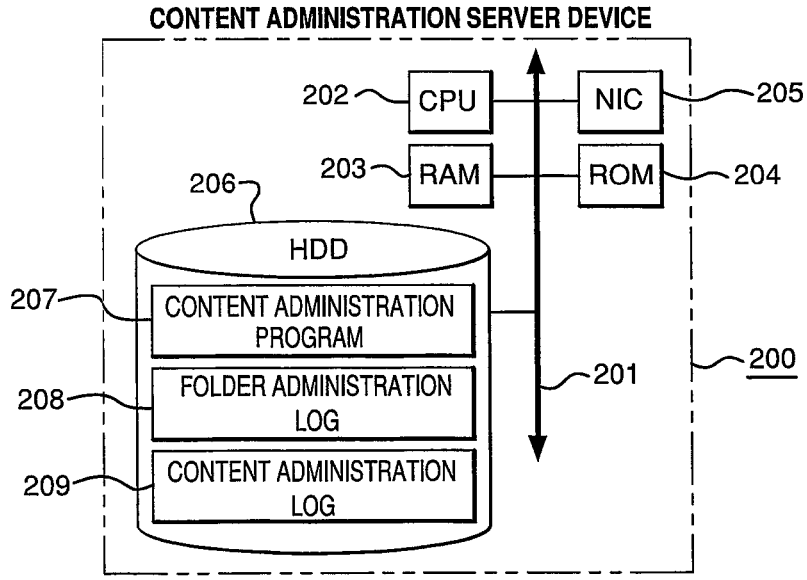
FIG. 3 is a block view showing a configuration for a content administration server device.

FIG. 3 is a structural view of the content administration server device 200. A CPU 202 taken as processing means, RAM 203, ROM 204, and HDD 206 (Hard Disk Drive) taken as storage devices, and NIC 205 (Network Interface Card) taken as communicating means are connected to the bus 201. The I/F is shown as an interface between a bus and various devices. A content administration program 207, folder administration log 208 and content administration log 209 are stored in the HDD 206. The CPU 202 reads from RAM 203 and executes a function for providing content stored in the content administration server device 200 or in another content administration server by reading out and executing the content administration program 207 stored in the HDD 206, and a function for exchanging information with other content administration devices and terminal devices via the NIC 205 and the Internet 300.

FIG. 4 is a view showing a configuration for data stored in the folder administration log 208. The folder administration log 208 stores information relating to folders storing content. The folder administration log 208 stores a "folder number" identifying a folder storing content, a "folder title" taken as a title displayed for the folder, a "folder password" taken as a password required when accessing the folder, a "URL for the time of an FTP" for identifying a URL of a site storing the content, "sharing permitted/not permitted" for identifying whether or not sharing of the folder is permitted, and a "sharing source user name" for identifying the name of the user that made the folder, with the folder administration log 208 storing these items in a mutually correlated manner. In this embodiment, the values for "sharing permitted/not permitted" are taken to be 0 or 1, with these being set to be 1 when sharing is permitted and 0 when sharing is not permitted.

FIG. 5 is a view showing a configuration for data stored in the content administration log 209. The content administration log 209 stores information relating to content. The content administration log 209 stores a "folder number" identifying a folder storing the content, an "icon number" identifying content stored in the folder, a "title" identifying a title for the content, and a "format" identifying the format of the content in a correlated manner. Here, the folder number uniquely identifies the folder, and the icon number uniquely identifies content of each folder. Further, the methods for generating the content administration log take on two formats. In a first format, folder information for within each folder storing the content constructed from a single file is read dynamically, with a log then being generated automatically. A second format is a format where a log causes content constituted by a folder or a plurality of files to be executed. The former is generated in a completely dynamic manner by the content administration program, and the latter is generated automatically and updated while the user performs settings from a setting screen.

Further, information stored in the folder administration log 208 and the content administration log 209 may be stored divided up into a plurality of files. Moreover, the information stored in the folder administration log 208 and the content administration log 209 may also be administered through storage in a database.

Still further, in order to share content between each user, file names and user identification information (user ID, password, etc.) for the folder administration log 208 and the content administration log 209 may be stored in advance in a correlated manner.

Next, a description is given of the operation of a system of this embodiment.

Figure 6:
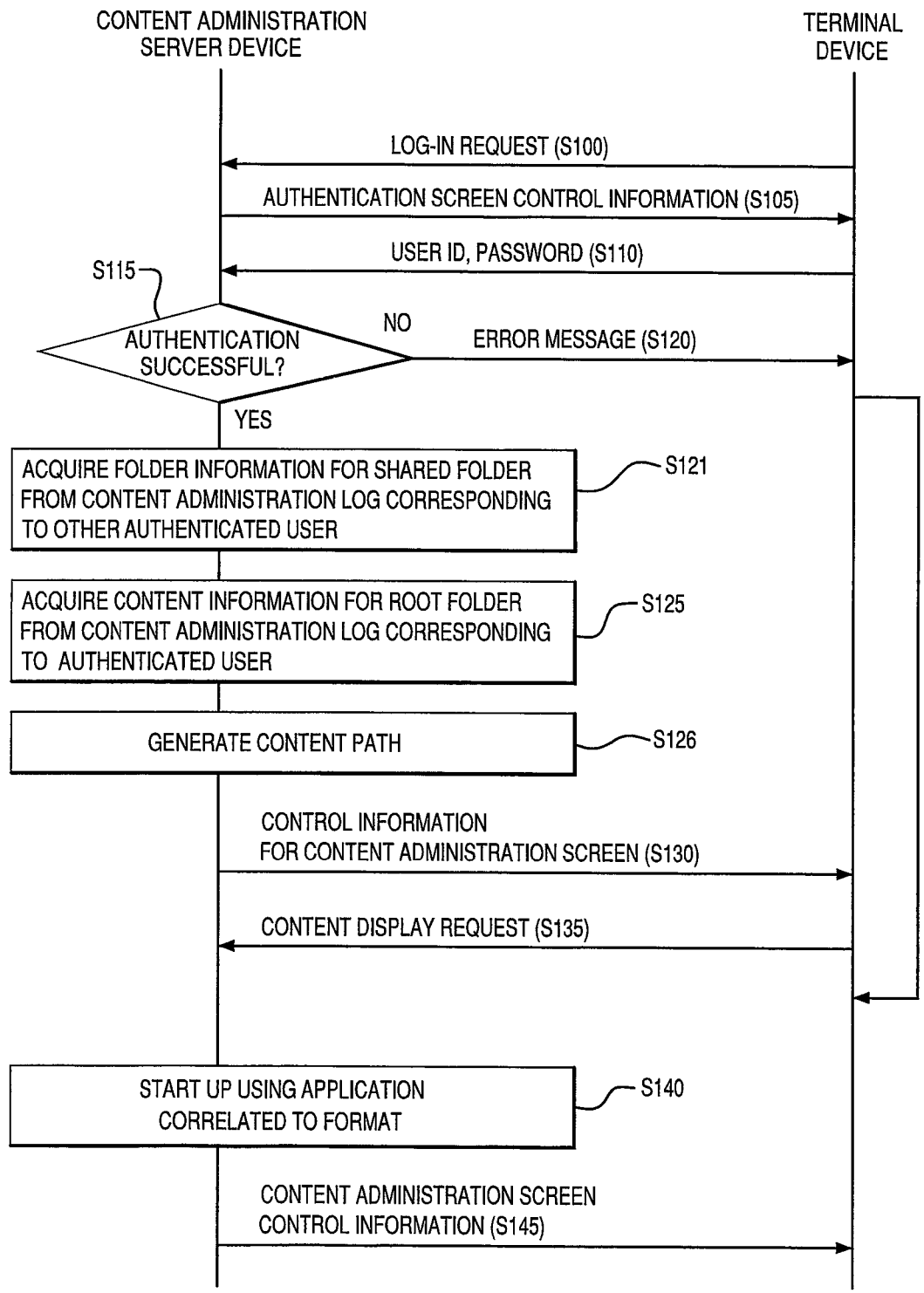
FIG. 6 relates to sharing of content between users of the same WEB site and shows a situation for communication between a terminal device and a content administration server device.

FIG. 6 relates to execution of sharing of content and execution of content between users of the same web site, and shows the situation for communication between the terminal device 100 and the content administration server device 200.

Figures 10, 11:
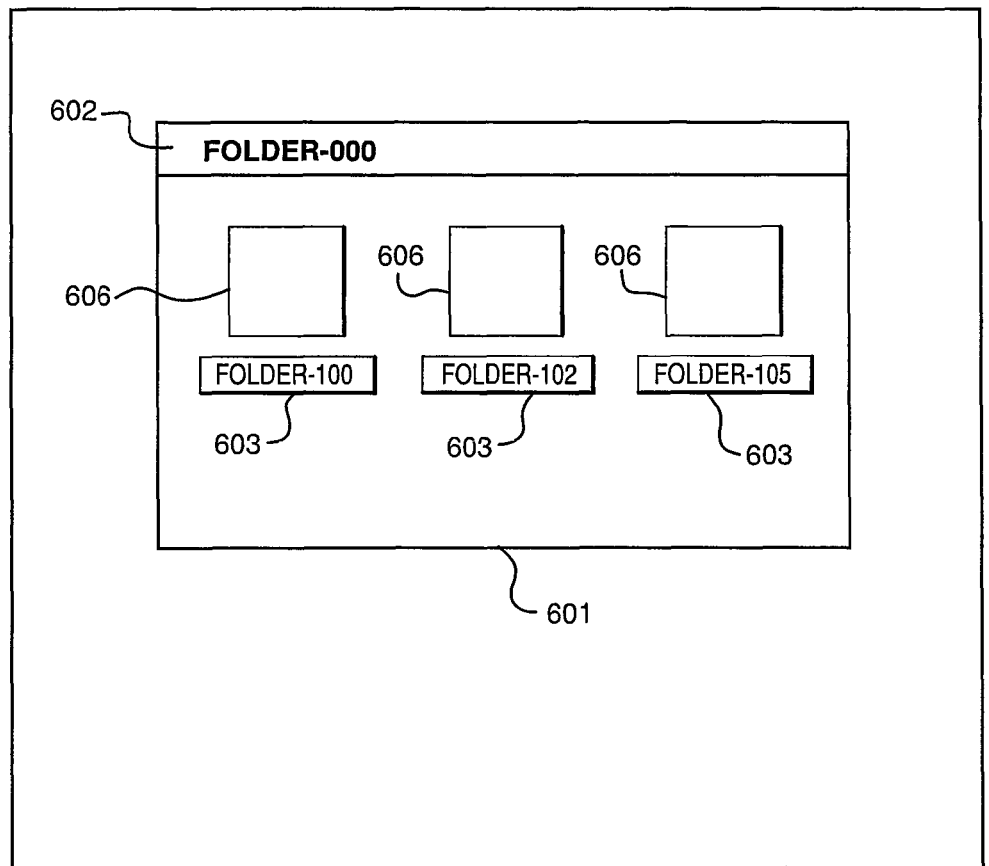
FIG. 10 is a view showing an example of a content administration screen.
FIG. 11 is a view showing an example of an upload screen.

The CPU 102 of the terminal device 100 sends a log-in request to the content administration server device 200 as a result of a user designating a prescribed URL using a web browser (S100). The CPU 202 of the content administration server device 200 receiving the log-in request then transmits confirmation screen control information (S105). The CPU 102 of the terminal device 100 that received the control information then displays a log-in screen at the web browser. The CPU 102 of the terminal device 100 then sends a user ID and password inputted using the keyboard 106 and the mouse 107 to the content administration server device 200 (S110). The CPU 202 of the content administration server device 200 receiving the user ID and the password then authenticates the user by making a comparison with a user ID and password stored in advance in the HDD 206 (S115). When authentication is successful, the CPU 202 of the content administration server device 200, in addition to retrieving the folder administration log for the authenticated user correlated to this user ID, the CPU 202 also retrieves the folder ascertaining that sharing is permitted, i.e. retrieves a value 1 for "sharing permitted/not permitted". The CPU 202 of the content administration server device 200 then acquires the "folder number", "folder title", "folder password", "URL for the time of an FTP", and "sharing source user name" correlated to "sharing permitted/not permitted" corresponding to search conditions as folder information (S121). Next, the CPU 202 of the content administration server device 200 retrieves the "folder number" corresponding to a root folder from the content administration log corresponding to the authenticated user, and acquires the "icon number", "title", and "format" correlated to the "folder number" corresponding to the search conditions (S125). Here, root folder is the folder at the uppermost position of a folder hierarchical structure. Further, the folder number corresponding to the root folder is pre-allotted with a specific value. Continuing on, the content administration server device 200 generates a content path in the following manner (S126). When the content is a folder, the CPU 202 of the content administration server device 200 generates a content path based on "URL for the time of an FTP" of the acquired folder information. Further, when the content is not a folder, the CPU 202 of the content administration server device 200 retrieves "folder number" of the same value as "folder number" for the acquired content information from the folder administration log and acquires "URL for the time of an FTP" correlated to the "folder number" corresponding to the search conditions. Next, the CPU 202 of the content administration server device 200 generates a content path based on the acquired "URL for the time of an FTP" and the "title" for the content information. The CPU 202 of the content administration server device 200 then transmits control information for a content administration screen containing an icon leading to the content to terminal device 100 as results of program execution based on an icon image stored in advance in a storage device and the generated content path (S130). The icon image may be changed for each content format. The CPU 102 of the terminal device 100 that received the control information displays a content administration screen at a web browser. FIG. 10 shows an example of a content administration screen. A content administration screen 600 is capable of displaying a plurality of windows 601, and can display designated content or playback audio. A window 601 is comprised of a field 602 for displaying the folder title, a field 603 for displaying the title of the content, and an icon 606 correlated with a content path. The user then presses on the icon 606 corresponding to content they wish to hear using a mouse 107 from a list of content displayed at the window 601. When the icon 606 is pressed using the mouse 107, the CPU 102 of the terminal device 100 sends a request to display content to the content administration server device 200 (S135). The URL of the content is already correlated to the icon by the content administration program and is outputted as results indicating which content administration server device 200 the content is stored in. As a result, when the icon 606 is pressed using the mouse 107, the content administration server device 200 corresponding to the correlated URL is accessed. The CPU 202 of the content administration server device 200 that has received the access request then starts up the content using an application correlated to the format of the content (S140). The application starting up the content is provided by an ASP (Application Service Provider). Next, the CPU 202 of the content administration server device 200 generates control information for a content administration screen containing display information for content outputted by the application. The CPU 202 of the content administration server device 200 then transmits the generated control information for the content administration screen to the terminal device 100 (S145). The CPU 102 of the terminal device 100 that received the control information displays a content administration screen at a web browser.

As a result, content provided by the content administration server device 200 can be shared between authenticated users of the same web site and can be executed from the web browser of the terminal device 100.

Figure 7:
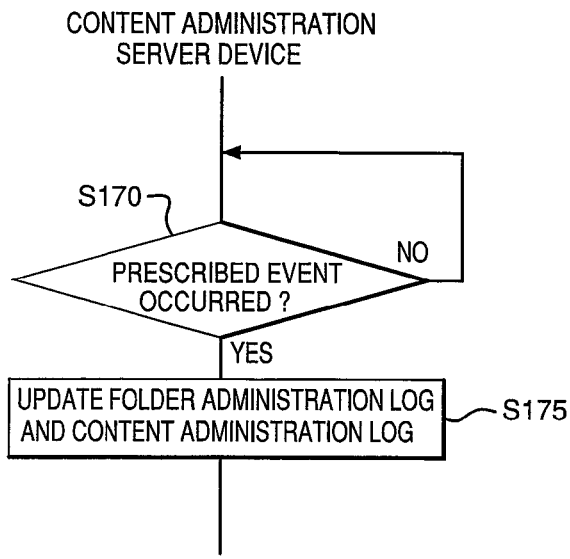
FIG. 7 relates to updating of a content path and is a view showing a situation for processing of a content administration server.

FIG. 7 relates to updating of a content path and is a view showing a situation for processing of a content administration server.

The CPU of the content administration server device determines whether or not a prescribed event has occurred (S170). Addition and deletion of the content of files within folders or the updating of various settings etc. may be given as the prescribed events. When a request for addition or deletion of content or for updating of settings etc. is received from the terminal device 100, the CPU of the content administration server device 200 receives this request, starts up a program, and carries out processing. In the case of updating various settings, making or deleting folders, or updating content configured from a plurality of files, the folder administration log and the content administration log can be automatically re-written (S175). For example, in the case of making a new folder, a "folder number" that is unique is attached to the folder administration log administering the folder, and this is stored in a manner correlating to the "title" and "folder password" etc. When a folder is deleted, the content administration server device 200 retrieves a "folder number" corresponding to the "folder number" sent from the terminal device 100, and the logs for the related "title" and "folder password" etc. are deleted. In the case of updating the content, DHTML (Dynamic Hyper Text Markup Language) is automatically generated from the new content administration log and the result is sent to the terminal device 100. At this time, updating of the content may be via HTTP or may utilize an FTP LS command. Further, it can also be considered in the future that in cases where content administration servers are compatible with the incorporation of file administration server modules such as webDAV (Web-enabled Distributed Authoring and Versioning) etc., content may then be updated using this function. When a password is set at a folder, a DHTML page into which an encrypted password is incorporated is generated by a program when a program is starting up, and this is sent to the terminal device 100.

In cases where the aforementioned prescribed event occurs, when the folder administration log is updated, a new content administration log is made in the following manner based on the updated folder administration log.

The CPU 202 of the content administration server device 200 then acquires a "folder number" from the folder administration log and "URL for the time of an FTP" correlated to the folder number. In the case of directly accessing the acquired "URL for the time of an FTP", the CPU 202 of the content administration server device 200 accesses the folder itself and acquires the "title" and "format" of the content stored in the folder. The CPU 202 of the content administration server device 200 then updates the content administration log based on the acquired "title", "format", and "folder number" correlated to the "URL for the time of an FTP". Here, the icon number is set to a value that is unique every folder number. Next, the CPU 202 of the content administration server device 200 generates a content path based on the updated content administration log and the folder administration log.

As a result, content path updating can be carried out automatically.

Figure 8:
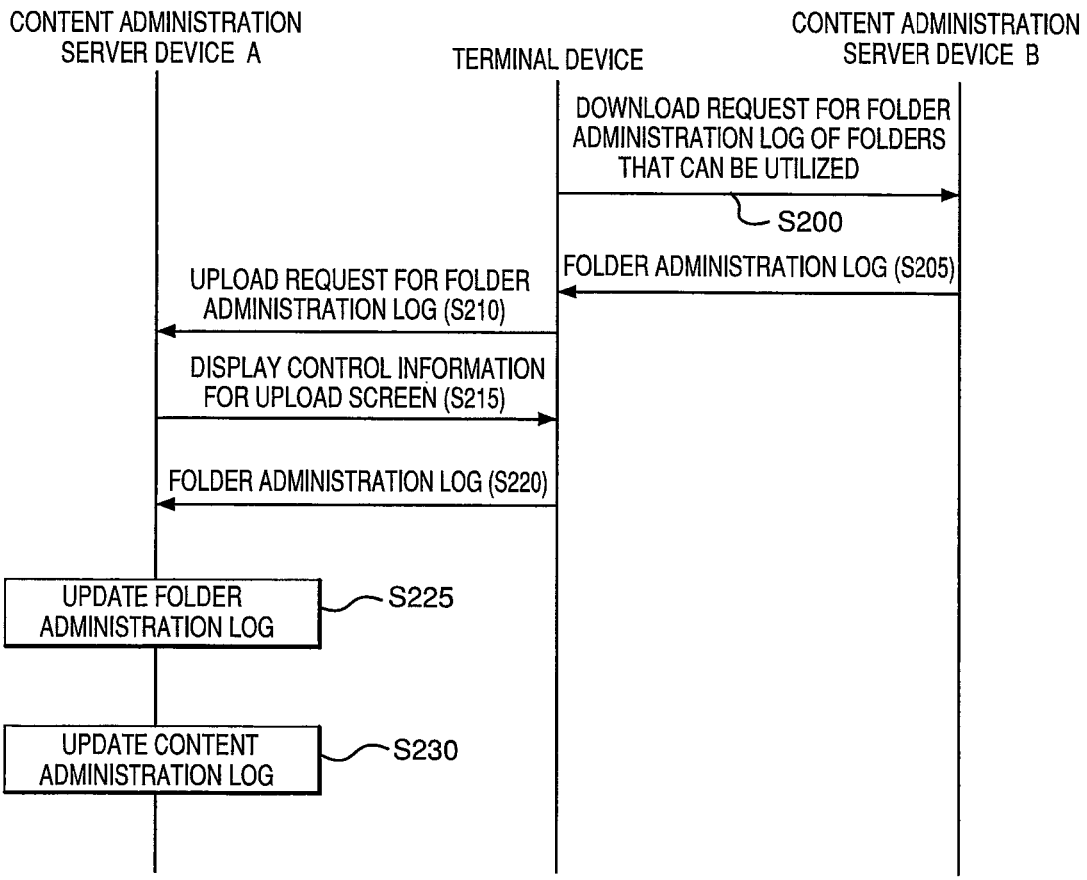
FIG. 8 relates to sharing of content between content administration server devices utilizing files, and shows a situation for communication between a terminal device and a content administration server device.

FIG. 8 relates to sharing of content between content administration server devices utilizing the files and shows the situation for communication between a content administration server device A, content administration server device B, and the terminal device 100. The content administration server device A and the content administration server device B are equipped with the same configuration and functions as the content administration server device 200 described above. Further, in FIG. 8, the folder administration log and content administration log of the content administration server device A are updated in order to utilize shared content of the content administration server device B as content of the content administration server device A.

It is therefore possible to publish content in such a manner that users that are set users or anonymous users (guests) may use the content as sharers. The CPU 102 of the terminal device 100 sends a request to download the folder administration log relating to the folder for which sharing is permitted to the content administration server device B as a result of a user designating a prescribed URL using a web browser (S200). The CPU of the content administration server device B that has received the folder administration log download request then retrieves folders for which sharing is permitted, i.e. folders with a "sharing permitted/not permitted" value of 1, from the file administration log stored in the HDD of the content administration server device B. The CPU of the content administration server device B then acquires the "folder number", "folder title", "folder password", "URL for the time of an FTP", and "sharing source user name" correlated to "sharing permitted/not permitted" corresponding to search conditions, and generates a folder administration log relating to folders permitting sharing. The CPU of the content administration server device B then transmits the generated folder administration log to the terminal device 100 (S205). The CPU 102 of the terminal device 100 stores the received folder administration log in the HDD of the terminal device 100. The CPU 102 of the terminal device 100 then sends a request to upload the stored folder administration log to the content administration server device A as a result of a user designating a prescribed URL using a web browser (S210). The CPU of the content administration server device A that has received the upload request then sends upload screen control information to the terminal device 100 (S215). The CPU 102 of the terminal device 100 that received the control information then displays an upload screen at a web browser. FIG. 11 is an example of an upload screen. An upload screen 700 is equipped with a field 701 for specifying a path to the folder administration log to be uploaded and an execute button 702. The user inputs a path for a folder administration log to be uploaded at the field 701 designating the path using the keyboard 106 and the mouse 107, and presses the execute button 702 with the mouse 107. When the execute button 702 is pressed using the mouse 107, the CPU 102 of the terminal device 100 sends the folder administration log stored at the inputted path to the content administration server device A (S220). The CPU of the content administration server device A then adds the data for the received folder administration log to the folder administration log stored in advance in the HDD of the content administration server device A (S225). At this time, "folder number" is allocated with values that are unique. Next, the CPU of the content administration server device A updates the folder administration log stored in the HDD of the content administration server device A based on the received folder administration log (S230). This updating is carried out by respectively correlating and storing data at the content administration log stored in the HDD of the content administration server device A in such a manner that the "folder number" becomes the value of the root folder, the "icon number" becomes a unique value each "folder number", the "title" becomes the "folder name" of the received administration log, and the "format" becomes a value indicating the folder.

As a result, the icon 606 correlated to the content of another content administration server device 200 can be referenced within the same user interface. This enables files to be utilized so as to implement sharing of content between content administration server devices. Here, methods utilizing cache files of web browsers can also be included as forms of sharing content utilizing files.

Figure 9:
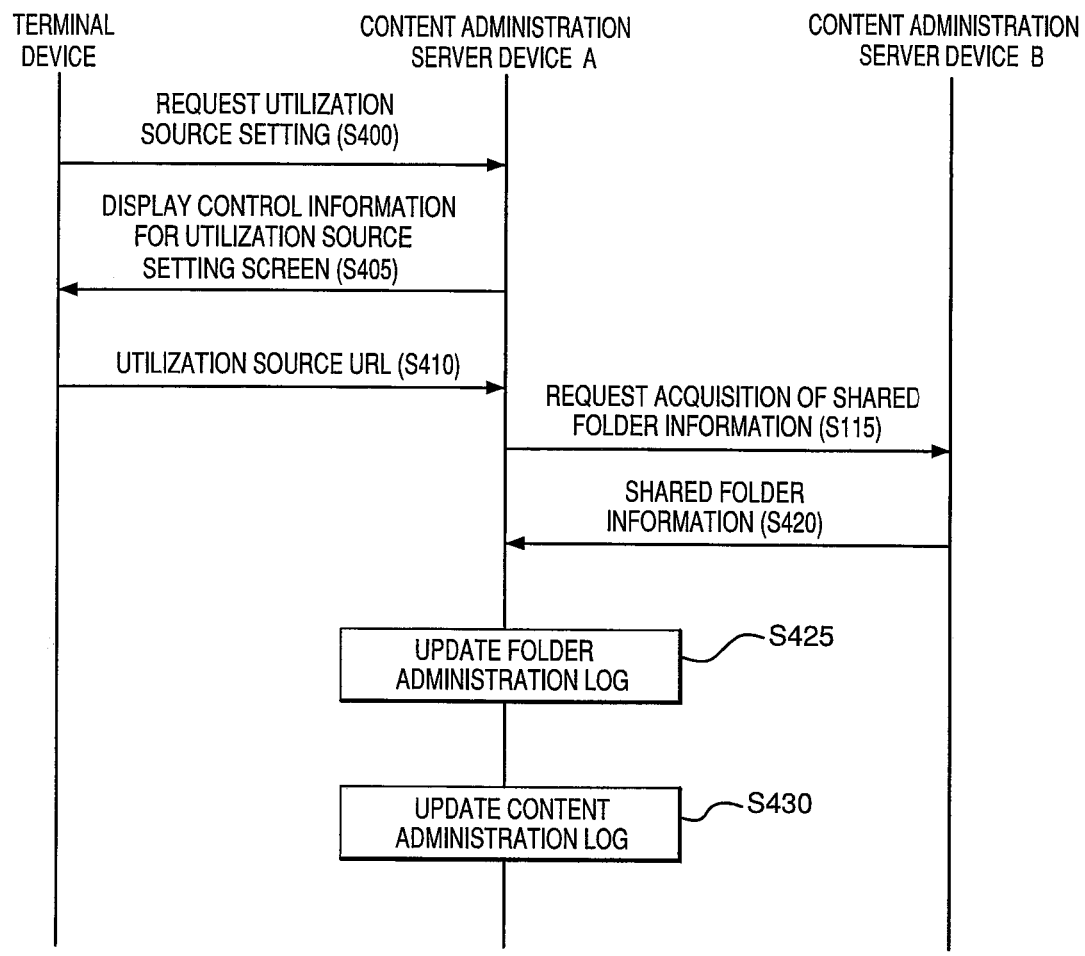
FIG. 9 relates to sharing of content utilized by direct communication between content administration server devices and is a view showing a situation for communication between a terminal device and a content administration server device.

FIG. 9 relates to sharing of content utilized as socket communication taken as direction communication between content administration server devices utilizing the files and shows the situation for communication between a content administration server device A, content administration server device B, and the terminal device 100. The content administration server device A and the content administration server device B are equipped with the same configuration and functions as the content administration server device 200 described above. Further, in FIG. 9, the folder administration log and content administration log of the content administration server device A are updated in order to utilize shared content of the content administration server device B as content of the content administration server device A.

Figure 12:
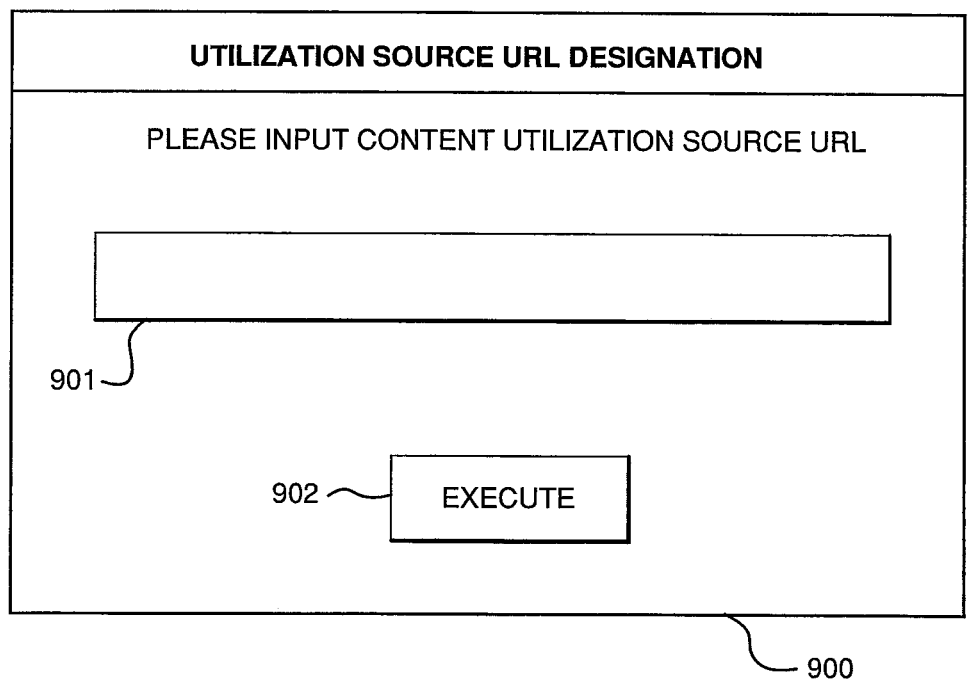
FIG. 12 is a view showing an example of a utilized source setting screen.

The CPU 102 of the terminal device 100 sends a request for utilization source settings of folders for which sharing is permitted to the content administration server device A as a result of a user designating a prescribed URL using a web browser (S400). The CPU of the content administration server device A that has received the utilization source settings request then sends utilization source setting screen control information to the terminal device 100 (S405). The CPU 102 of the terminal device 100 that received the control information then displays a utilization source setting screen at a web browser. FIG. 12 is a view showing an example of an upload screen. A utilization source setting screen 900 is equipped with a field 901 for designating a utilization source URL for the content, and an execute button 902. The user inputs a utilization source URL for the content at the field 901 for designating the URL using the keyboard 106 and the mouse 107 and presses the execute button 902. When the execute button 902 is pressed using the mouse 107, the CPU 102 of the terminal device 100 sends the inputted URL to the content administration server device A (S410). The CPU of the content administration server device A then sends a shared folder information acquisition request to the content administration server device B corresponding to the inputted URL (S415). The CPU of the content administration server device B that has received the shared folder information acquisition request then retrieves folders for which sharing is permitted, i.e. folders with a "sharing permitted/not permitted" value of 1, from the folder administration log stored in the HDD of the content administration server device B. The CPU of the content administration server device B then acquires the "folder number", "folder title", "folder password", "URL for the time of an FTP", and "sharing source user name" correlated to "sharing permitted/not permitted" corresponding to search conditions as shared folder information. The CPU of the content administration server device B sends acquired shared folder information to the content administration server device A (S420). As with the case of sharing of content between content administration server devices utilizing files, the CPU of the content administration server device A that has received the shared folder information then updates the folder administration log of the content administration server device Abased on the received shared folder information (S425), and updates the content administration log of the content administration server device A (S430).

As a result, the icon 606 correlated to the content of another content administration server device 200 can be referenced within the same user interface. This enables the implementing of sharing of content utilizing direct communication between content administration servers. Further, even when shared content is updated, an updated icon 606 can be displayed because synchronized processing is carried out periodically. Namely, even if the shared content is updated, a user referencing the shared content can refer to the icon 606 reflecting the updated content within the same user interface.

When an administrator of a web site adds content to a web site administered by themselves or shares content of another web site, the content administration server device 200 refers to the content administration log for the added content or the shared content so that an icon leading to the added content or shared content is automatically added and, for example, a content path does not have to be described at the HTML file.

Further, application programs corresponding to content are provided using ASP services etc. It is therefore possible for the content to be executed without having to install a program corresponding to the content at the terminal device of the user beforehand.

Further, a specific protocol is avoided in file administration because the program operates based on the language module of the web server. A webDAV module may also be utilized in the future.

Further, operation is based on the web browser function, and it is therefore not necessary to make the address of the terminal device public, or to carry out special network settings.

Namely, the webDAV of the related art is a file administration server that uses the HTTP protocol. This is mainly incorporated as a web server module, and is used in application-based services such as Net Drive. This gives the advantages of being able to apply file restrictions that are more detailed than with FTP protocol (utilized in file sharing by users etc.), reducing traffic between terminals and servers to less than that of conventional FTP etc. by performing file processing within the server, and the characteristic of being taken as an extension of HTTP (the port used may simply be that for HTTP etc.). Currently, use as an application base is typical but it is necessary to install software and carry out network settings on local personal computers using the OS.

On the other hand, a specific protocol is avoided in file administration because the program operates based on the language module of the web server of this embodiment. Transmission and receipt of file information via HTTP is also possible and compatibility with file administration using the FTP protocol can also be achieved. In the future, it can be considered to administer files utilizing webDAV modules on the web server-side. Operation compatible with widespread typical communication environments at a large number of providers is possible when a user is installing a homepage. Services over a network can therefore be deployed on a persons own homepage, with a user then being able to make their own homepage and easily carry out operations for updating content on a browser.

Further, this is not dependent on the local personal computer or desktop and operation can take place based on the functions of an Internet browser. It is therefore not necessary to make the address of the local personal computer known and special network settings are not required. An advantage of this embodiment is that information can be gathered over the Internet and be kept. Further, applications are started up over a network without requiring file storage or administration over a network. Therefore, merely by giving consideration to the browsing environment, it is possible to update, view, share and administer content on a network by carrying out all desktop operations using a browser.

The distinction with performing network services on the provider-side is that in the related webDAV and NetDrive services, substantial storage elements are required just to hold and administer the files over the network, and this embodiment may therefore be utilized as a platform for making this application widespread. From now on, as applications run over a network become widespread, cooperation with this application service provider will become necessary. Currently, if an application is downloaded locally, there is a possibility that files saved on the web may be deployed. However, file operations using applications depend on the local PC and the provider-side is such that it is necessary for a user to actively acquire an application or a service. On the other hand, the advantage of receiving content of others and application services using a homepage is that it is not necessary on the provider-side for the user to actively access the website of their own company every time. Periodic user administration is possible by utilizing a system or application and services that do not have monthly usage limits are therefore possible.

In the above embodiment, the content administration server device 200 is configured from a single computer, but may also be a distributed system constituted of a plurality of computers.

Further, the content administration server device 200 and the terminal device 100 are connected to the Internet 300 but the communication medium does not have to be the Internet, and may also be an intranet, LAN, WAN or VPN (Virtual Private Network) etc.

The terminal device 100 is a device having a network connection function and may be connected to the Internet 300 in a wired or wireless manner. The terminal device 100 may also include PDAs and mobile telephones having Internet browsing functions.

Further, the content administration program 207 is by no means limited to being stored on the HDD and may be stored on any computer-readable medium. Similarly, the folder administration log 208 and content administration log 209 may be stored on any computer readable/writeable medium.

The content administration screen 600 is a Window type but the form of displaying may also be changed for every user.

What is claimed is:
1. A terminal device comprising:
a transmitter that transmits user identification information to a server; and
a receiver that receives, from the server, display control information which is generated based on:
(a) first content administration information for a first user corresponding to the user identification information; and
(b) second content administration information for a second user, wherein the second content administration information includes sharing permission information,
wherein the display control information includes first link information comprising a URL included in the first content administration information and second information included in the second content administration information which is permitted to be accessed by the first user,
wherein the terminal device displays a screen based on the display control information,
wherein the screen simultaneously comprises a plurality of windows, at least one of the plurality of windows including an icon image and title information located adjacent to the icon image,
wherein the icon image is associated with a content path and a content correlated with the content path is accessed in response to a press of the icon image, and
wherein a new content path is generated based on an updated folder administration log and associated to the icon image based on an updated content, and the icon image is not changed.

2. The terminal device according to claim 1, further comprising:
a web browser that displays the screen based on the display control information.

3. The terminal device according to claim 2, wherein the icon image is changed according to a content corresponding to at least one of the first link information comprising the URL and the second information.

4. The terminal device according to claim 1, wherein the second content administration information includes a second URL for the second user.

5. The terminal device according to claim 4, wherein the display control information includes second link information comprising the second URL.

6. A terminal device comprising:
a transmitter that transmits user identification information to a server; and
a receiver that receives, from the server, display control information including first link information comprising a URL for a first user corresponding to the user identification and second information, which includes sharing permission information, for a second user which is permitted to be accessed by the first user,
wherein the terminal device displays a screen based on the display control information,
wherein the screen simultaneously comprises a plurality of windows, at least one of the plurality of windows including an icon image and title information located adjacent to the icon image,
wherein the icon image is associated with a content path and a content correlated with the content path is accessed in response to a press of the icon image, and
wherein a new content path is generated based on an updated folder administration log and associated to the icon image based on an updated content, and the icon image is not changed.

7. The terminal device according to the claim 6, further comprising:
a web browser that displays the screen based on the display control information.

8. The terminal device according to the claim 7, wherein the icon image is changed according to a content corresponding to at least one of the first link information comprising a URL and the second information.

9. The terminal device according to the claim 6, wherein the display control information includes second link information comprising a second URL for the second user.

10. A terminal device comprising:
a transmitter that transmits user identification information to a server; and
a receiver that receives, from the server, display control information including first link information comprising a URL for a first user corresponding to the user identification information and second information including sharing permission information, which is included in content administration information for a second user which is permitted to be accessed by the first user,
wherein the terminal device displays a screen based on the display control information,
wherein the screen simultaneously comprises a plurality of windows, at least one of the plurality of windows including an icon image and title information located adjacent to the icon image,
wherein the icon image is associated with a content path and a content correlated with the content path is accessed in response to a press of the icon image, and
wherein a new content path is generated based on an updated folder administration log and associated to the icon image based on an updated content, and the icon image is not changed.

11. A terminal device comprising:
a transmitter that transmits user identification information to a server; and
a receiver that receives, from the server, display control information including first link information comprising a URL including sharing permission information which is included in content administration information for a first user corresponding to the user identification and second information for a second user which is permitted to be accessed by the first user,
wherein the terminal device displays a screen based on the display control information, and
wherein the screen simultaneously comprises a plurality of windows, at least one of the plurality of windows including an icon image and title information located adjacent to the icon image,
wherein the icon image is associated with a content path and a content correlated with the content path is accessed in response to a press of the icon image, and
wherein a new content path is generated based on an updated folder administration log and associated to the icon image based on an updated content, and the icon image is not changed.

12. The terminal device according to claim 11, wherein the display control information includes second link information comprising a second URL including second sharing permission information which is included in second content administration information for a second user.

13. A server comprising:
a receiver that receives user identification information from a terminal device; and
a transmitter that transmits, to the terminal device, display control information which is generated based on:
(a) first content administration information for a first user corresponding to the user identification information; and
(b) second content administration information for a second user, wherein the second content administration information includes sharing permission information,
wherein the display control information includes first link information comprising a URL contained in the first content administration information and second information contained in the second content administration information which is permitted to be accessed by the first user,
wherein the terminal device displays a screen based on the display control information,
wherein the screen simultaneously comprises a plurality of windows, at least one of the plurality of windows including an icon image and title information located adjacent to the icon image,
wherein the icon image is associated with a content path and a content correlated with the content path is accessed in response to a press of the icon image, and
wherein a new content path is generated based on an updated folder administration log and associated to the icon image based on an updated content, and the icon image is not changed.

14. The server according to claim 13, wherein a web browser displays the screen based on the display control information.

15. The server according to claim 14, wherein the icon image is changed according to a content corresponding to at least one of the first link information comprising the URL and the second information.

16. The server according to claim 13, wherein the display control information includes second link information comprising a second URL contained in the second content administration information.

17. A server comprising:
circuitry configured to:
receive user identification information from a terminal device; and
transmit, to the terminal device, display control information including first link information comprising a URL related to a first user corresponding to the user identification and second information, which includes sharing permission information, related to a second user which is permitted to be accessed by the first user,
wherein the terminal device displays a screen based on the display control information,
wherein the screen simultaneously comprises a plurality of windows, at least one of the plurality of windows including an icon image and title information located adjacent to the icon image,
wherein the icon image is associated with a content path and a content correlated with the content path is accessed in response to a press of the icon image, and
wherein a new content path is generated based on an updated folder administration log and associated to the icon image based on an updated content, and the icon image is not changed.

18. The server according to claim 17, wherein a web browser displays the screen based on the display control information.

19. The server according to claim 18, wherein the icon image is changed according to a content corresponding to at least one of the first link information comprising the URL and the second information.

20. The server according to claim 17, wherein the display control information includes second link information comprising a second URL related to a second user.

21. A server comprising:
circuitry configured to:
receive user identification information from a terminal device; and transmit, to the terminal device, display control information including first link information comprising a URL related to a first user corresponding to the user identification and second information, related to a second user, which is permitted to be accessed by the first user, wherein the terminal device displays a screen based on the display control information, wherein the screen simultaneously comprising a plurality of windows, at least one of the plurality of windows including an icon image and title information located adjacent to the icon image, wherein the icon image is associated with a content path and a content correlated with the content path is accessed in response to a press of the icon image, and wherein a new content path is generated based on an updated folder administration log and associated to the icon image based on an updated content, and the icon image is not changed.

22. The server according to claim 21, wherein the second information includes sharing permission information.

23. The server according to claim 21, wherein the plurality of windows comprises a first window including a plurality of icon images and title information corresponding to the plurality of icon images.

24. The server according to claim 21, wherein the display control information includes second link information comprising a second URL related to a second user.

* * * * *